United States Patent [11] 3,548,728

[72] Inventors Kenji Ariyasu;
 Akira Tsuji, Kanagawa, Japan
[21] Appl. No. 692,565
[22] Filed Dec. 21, 1967
[45] Patented Dec. 22, 1970
[73] Assignee Fuji Shaskin Film Kabushiki Kaisha
 Kanagawa, Japan
[32] Priority Dec. 21, 1966
[33] Japan
[31] No. 41/16423

[54] ROLL FILM HOLDER
 1 Claim, No Drawings
[52] U.S. Cl. .................................................. 95/34
[51] Int. Cl. ........................................... G03b 19/04
[50] Field of Search ...................................... 95/34

[56] References Cited
UNITED STATES PATENTS

| | | | |
|---|---|---|---|
| 790,123 | 5/1905 | Hall | 95/34 |
| 968,716 | 8/1910 | Vale | 95/34 |
| 2,609,739 | 9/1952 | Tatro | 95/34 |
| 3,160,083 | 12/1964 | Neumeister | 95/34 |
| 3,223,011 | 12/1965 | Hunt | 95/34 |

*Primary Examiner*—John M. Horan
*Assistant Examiner*—David S. Stallard
*Attorney*—Sughrue, Rothwell, Mion, Zinn & Macpeak ABSTRACT: A film holder of the slide inserting type carries roll film within a double magazine. The film loop projects from the magazine surrounding a film pressure plate which forces the film against the holder film window. The plate is removably inserted within grooves formed within the film holder, after the film loop surrounds it.

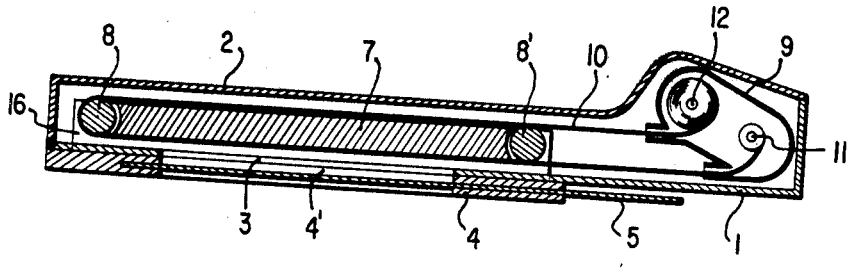

PATENTED DEC 22 1970 3,548,728
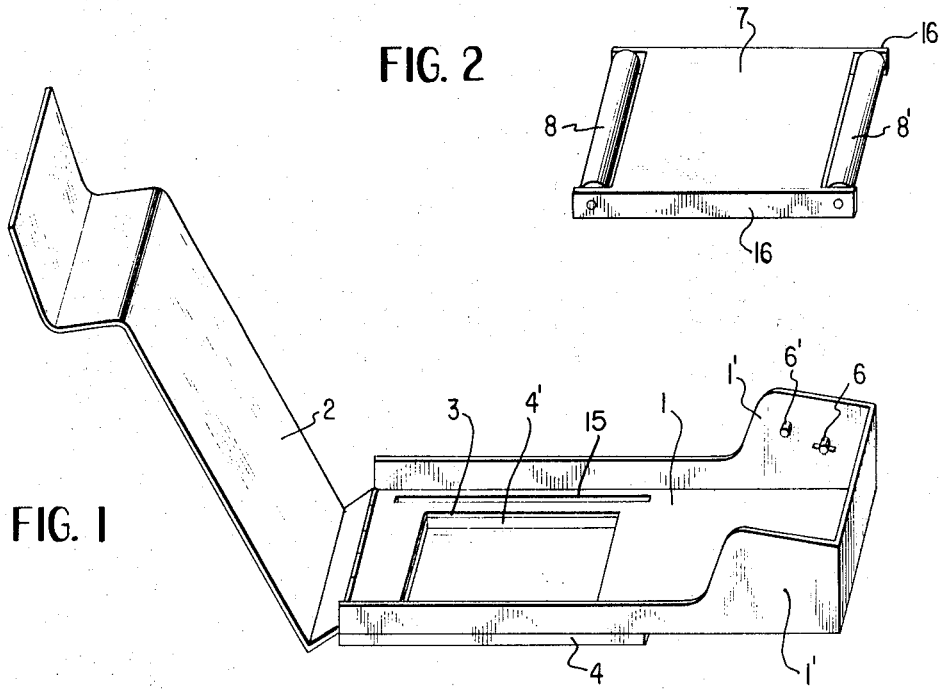
FIG. 2
FIG. 1
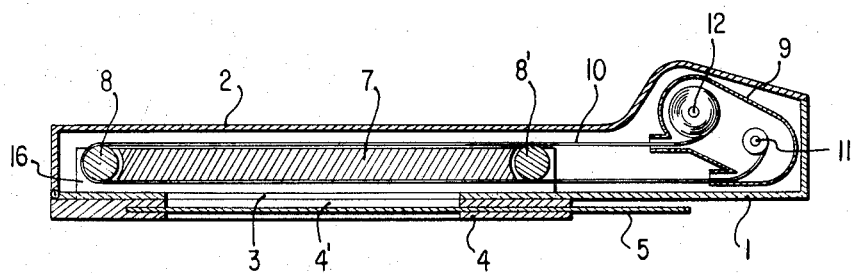
FIG. 3
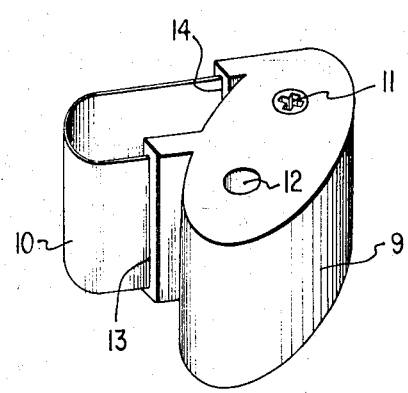
FIG. 4
INVENTORS.
KENJI ARIYASU
AKIRA TSUJI
BY Sughrue, Rothwell, Mion, Zinn & Macpeak
ATTORNEYS.

ROLL FILM HOLDER

In the prior art, it is known to employ a roll film holder for film of large frame size and in which the film holder has both takeup and supply portions assembled at one end of the holder, with the holder being inserted between the camera body from one side, much the same as a cut film holder or a pack film holder, thereby shortening the time from camera focusing to film exposure (such a film holder is shown in Japanese Pat. Publication 40-27995). In these roll film holders, since the pressure plate is hinged with the holder body, it is necessary, in order to load a film into the holder, to fixedly position the film supply spool or a film magazine having a film therein at one end, to the holder body. It is also necessary to guide the takeup spool which is engaged with the other end of the film along a roller mounted at the end of the film pressure plate in such a manner as to fold the film about the roller and then to couple the end of the same to the takeup spool at another portion of the holder body. Therefore, it is impossible to load a double magazine into the film holder in the manner described above, since in a double magazine, the film supply portion and the takeup portion are integral with each other and the film outlet and inlet of the double magazine are both provided on the magazine body portion with the film end which passes out from the outlet is fixed to the takeup spool through the cartridge inlet.

It is, therefore, an object of the present invention to provide a roll film holder of the slide inserting type which allows the loading of film on the holder from a double magazine carried thereby.

Other objects of this invention will be apparent from the following description taken in conjunction with the accompanying drawings, in which:

FIG. 1 is a perspective view of the roll film holder of the present invention with the cover open and the film pressure plate removed.

FIG. 2 is a perspective view of the film pressure plate employed with the holder of the present invention.

FIG. 3 is a vertical cross-sectional view of the film holder of the present invention with a loaded film in position.

FIG. 4 is a perspective view of one embodiment of a double magazine which may be employed with the film holder of the present invention.

Referring to FIG. 1, the holder body 1 is provided with a hinged cover member 2, with the holder body 1 including a roll film containing compartment at the right-hand end of the holder. At the center of the holder body 1, a film window 3 is provided, and outside of the film window 3, there is provided a plate 4 having an opening 4' which is of the same dimensions as the film window 3. On the plate 4, there is slidably mounted a cover 5 which is selectively opened to expose the film behind the film window 3. On the sidewalls 1' of the holder body 1 are provided a pair of film roll supporting axes 6, 6', at least one of which is rotatable from the outside and operates as the takeup roll drive axis.

Referring to FIG. 2, rollers 8 and 8' are rotatably mounted at opposite ends on a film pressure plate 7 which is adapted to be fixedly coupled to the holder body 1 in the vicinity of the film window 3, the plate being fixed to the inner surface of the holder body 1 by some means. Where the holder is used with a double magazine 9 of the type shown in FIG. 4, a roll film 10 is carried thereby with an end portion 11 of the film takeup spool being engageable with the support drive axis 6, this axis being rotatable from outside of the holder by manual or other means. The film supply spool carried by the magazine has a portion 12 which engages the other supporting axis 6', the axes 6–6' acting to fixedly couple the double magazine 9 to the roll film holder 1. The film 10 is drawn out of the film supply outlet 13 of the magazine 9. The film pressure plate 7 is inserted into the cavity formed by the U-shaped bent film 10 and the film pressure plate is then fixedly coupled to the holder 1 in the manner shown in FIG. 3.

The film pressure plate 7 may be fixed to the holder 1 by various means. One manner of attachment involves providing the film holder 1 with a longitudinal groove or grooves 15 on the inner surface thereof, while providing the film pressure plate 7 with an elongated projection 16 along one or both sides which is received by the grooves 15 such that the film pressure plate is accurately positioned within the film holder. Alternatively, the film pressure plate 7 may be fixed to the film holder 1 by providing a projection on the end plane of the pressure plate 7 and by further providing a hole or recess on the inner surface of the sidewall of the film holder, in which case, the sidewall hole receives the projection and thus, the pressure plate is fixed to the film holder 1. Roller 8, which is mounted at the left-hand end of the film pressure plate 7, is in contact with inner surface of the film 10, where the film is bent in U-shape thereby facilitating smooth takeup of the film by the takeup spool. The other roller 8' is disposed between the double magazine 9 and the right-hand end of the pressure plate 7 and is in contact with the inner surface of the film and guides the film to the pressure plate from the magazine 9, further smoothing the feeding of the film and preventing scratching of the same.

The double magazine 9, which, in addition to its supply spool, carries a takeup spool, thus makes the handling of the film easy. It further makes it ps possible to exclude the use of two separate spools or two magazines in the film holder, while reducing the volume within the film holder which is occupied by the film magazine. Further, the supply spool is not always necessary in a double magazine, in which case, the takeup spool 11 is sufficient, the takeup spool having an end which projects from the wall of the magazine.

The spacing between the film supply outlet 13 and the inlet guide 14 is not necessarily smaller than the diameter of roller 8', but when this is smaller, the roller 8' is in good contact with the film 10 on both sides thereof, facilitating the smooth feeding of the film.

The roll film holder, in accordance with the present invention, is available for use with a single magazine and spool, a feed or supply and takeup spool, or as mentioned previously, with the double magazine 9. The film roller of the present invention thus makes it possible to use a double magazine for a roll film holder of the slide insertable type which has been impossible prior to the present invention. Since numerous changes may be made in the above-described construction, and differing embodiments of the invention may be made without departing from the spirit and scope thereof, it is intended that all matter contained in the foregoing description or shown in the accompanying drawings shall be interpreted as illustrative and not in a limiting sense.

We claim:

1. A film holder of the slide inserting type for loading with roll film including a film loop extending therefrom said holder comprising: a longitudinally extending body portion including a film window, a cover member hinged to said body portion and forming therewith a roll film holder portion offset and to one side of said window, a pressure plate having a roller at the end opposite said roll film holder portion, and means for fixedly positioning said plate relative to said body portion, within said film loop and in overlying relationship with said window, said means comprising a longitudinal groove extending along said window, and an elongated projection carried by said plate, extending along one side thereof, outside the edges said film loop, and being closely received within said longitudinal groove.